(12) United States Patent
Miller et al.

(10) Patent No.: US 8,473,238 B2
(45) Date of Patent: Jun. 25, 2013

(54) TEMPERATURE MEASUREMENT CORRECTION USING MULTIPLE TEMPERATURE SENSORS

(75) Inventors: Matthew Miller, Grass Valley, CA (US); Ralph M. Kling, Sunnyvale, CA (US)

(73) Assignee: Moog Inc., East Aurora, NY (US)

( * ) Notice: Subject to any disclaimer, the term of this patent is extended or adjusted under 35 U.S.C. 154(b) by 338 days.

(21) Appl. No.: 12/854,652

(22) Filed: Aug. 11, 2010

(65) Prior Publication Data
US 2012/0041703 A1   Feb. 16, 2012

(51) Int. Cl.
*G01K 15/00*   (2006.01)
*G06F 11/30*   (2006.01)

(52) U.S. Cl.
USPC .............. 702/99; 702/104; 702/130; 702/182

(58) Field of Classification Search
USPC ............ 702/99–105, 121–123, 130, 182–190
See application file for complete search history.

(56) References Cited

U.S. PATENT DOCUMENTS

| | | | |
|---|---|---|---|
| 2005/0101287 A1* | 5/2005 | Jin et al. | 455/404.1 |
| 2006/0028338 A1* | 2/2006 | Krishan et al. | 340/539.13 |
| 2006/0209921 A1* | 9/2006 | Brown et al. | 374/109 |
| 2010/0128754 A1* | 5/2010 | Jetter et al. | 374/110 |

OTHER PUBLICATIONS

PCT International Search Report and Written Opinion, PCT Application No. PCT/US2011/042210, Nov. 1, 2011, 15 pages.

* cited by examiner

*Primary Examiner* — Phuong Huynh
(74) *Attorney, Agent, or Firm* — Hodgson Russ LLP

(57) ABSTRACT

Correcting a temperature measurement of a target sensed at one temperature sensor in an asset tracking device by using another temperature sensor. The asset tracking device includes at least one heat source that affects the temperature sensor for sensing the temperature of the target. The other temperature sensor measures temperature at a location in the asset tracking device. The relationships between an actual temperature of the target and the temperature measured at the two sensors are established through experiments or model. Using the relationships, the measured temperature of the target can be corrected to obtain a corrected temperature of the target.

18 Claims, 3 Drawing Sheets

TEMPERATURE MEASUREMENT CORRECTION USING MULTIPLE TEMPERATURE SENSORS

FIELD OF THE INVENTION

This invention relates to correcting errors in temperature measurements in a remote asset tracking device.

BACKGROUND OF THE INVENTION

An asset tracking device is deployed to track the location or other physical properties of an asset as they move between locations. For this purpose, the asset tracking device may include one or more types of sensors that monitor its locations or physical properties and send the monitored results to a remote station. The transmission of the monitored results is often accomplished by wireless communication. The asset tracking device is generally implemented in a small and portable form and includes batteries or other energy sources that provide power while the asset is being transported between locations.

One of the physical properties measured by the asset tracking device is temperature. The asset tracking device may include a temperature sensor to monitor the temperature of a target or its surrounding environment. The asset tracking device, however, generally includes various sources of heat such as circuit components for radio frequency (RF) communication. These components tend to heat up the asset tracking device when active. If the temperature sensor is close to such heat source or connected via non-insulated materials, the heat generated by the heat source tends to interfere with an accurate measurement of the temperature at the temperature sensor by raising the temperature at the temperature sensor. As the asset tracking device becomes more compact, the heat generated by the heat source more significantly affects the temperature measurements.

One solution to mitigating the effects of the heat source on the temperature measurements is to divide up the asset tracking device into two multiple physical parts. A first part includes a temperature sensor and is placed within or proximate to the target whose temperature is being measured. A second part is physically separate from the first part, and hence, the effect of heat from the second part is reduced. The first part communicates with the second part via short-range RF communication or wired communication to transmit monitored result to the second part without generating significant heat within the first part. The second part includes RF components for a long-range communication to transmit the data to a remote monitoring station. The RF components in the second part generate significant amount of heat, but the heat from the second part does not or has a minimal effect on the temperature measured at the first part because the heat from the second part is only partially transmitted to the first part.

However, the solution of implementing the asset tracking device into two parts may significantly limit the physical locations of the asset tracking device due to the communication range of the short-range RF communication or the lengths of the wire. The asset tracking device with wired communication also requires external wire ports at the first and second parts, and complicating the packaging of the asset due to the wire.

SUMMARY OF THE INVENTION

Embodiments relate to correcting a temperature measurement received from a primary temperature sensor in a device by using another temperature measurement of a location in the device received from at least one secondary temperature sensor. The temperature measured at the primary temperature sensor represents an uncorrected temperature measurement of a target that may be affected by heat generated by at least one heat source included in the device. The temperature measurement from the at least one secondary temperature sensor is indicative of the amount of heat transmitted from the heat source to the primary temperature sensor, and hence, the temperature measurement from the primary temperature sensor can be used to compensated higher temperature measurement obtain at the primary temperature sensor.

In one embodiment, the device includes a processor for computing the corrected temperature. The processor computes the corrected temperatures by applying the first temperature and the second temperature to a correction algorithm. The function or parameter in the correction algorithm is determined by measuring temperatures in a controlled environment before deployment of the device for use.

In one embodiment, at least one secondary temperature sensor is located closer to the heat sensor than the primary temperature sensor.

In one embodiment, the heat source is a communication module for transmitting, among other information, the corrected temperature to a remote location via long-range wireless communication. Alternatively, the heat source is a receiver or a processor for a Global Navigation Satellite Systems ("GNSS"), which is the standard generic term for satellite navigation systems ("sat nav") that provide autonomous geo-spatial positioning, including but not limited to GPS, Glonas, and Galileo. Within this disclosure, any reference to GPS or GNSS should be interpreted to include this full range of sat nav systems.

DETAILED DESCRIPTION OF INVENTION

Embodiments relate to correcting a temperature measurement of a target sensed at a temperature sensor in an asset tracking device by using a temperature measurement from another temperature sensor. The asset tracking device includes at least one heat source that affects the temperature sensor for sensing the temperature of the target. The other temperature sensor measures temperature at a location in the asset tracking device. The relationships between an actual temperature of the target and the temperature measured at the two sensors are established through experiments or modeling. Using the relationships, the measured temperature of the target can be corrected to obtain a corrected temperature of the target.

Architecture of Asset Tracking System

Figure 1:
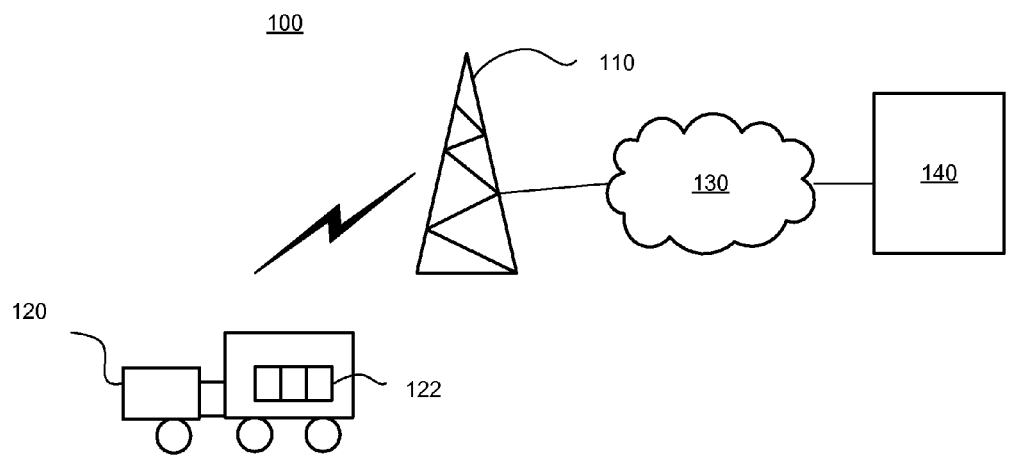
FIG. 1 is diagram illustrating a system for an asset tracking device, according to one embodiment of the present invention.

FIG. 1 is diagram illustrating a system 100 for an asset tracking device 122, according to one embodiment of the present invention. The system 100 for tracking an asset may include, among other components, an asset tracking device 122, a communication station 110, a network 130 and a monitoring station 140. The asset tracking device 122 is mounted on an asset (e.g., cargo) transported by a vehicle 120. The asset tracking device 122 communicates with the wireless communication station 110 to transmit monitored or sensed data to the monitoring station 140 via the network 130. The wireless communication station 110 and the network 130 may be part of various types of wireless communication infrastructure such as a cellular communication network.

The vehicle 120 moves from an origin to a destination during which the asset undergoes changing physical conditions (e.g., temperature, humidity, sound and vibration). The asset and the asset tracking device 122 may be transported in various other transport means such as trains, ships or airplanes, and can also be carried in more than one type of transport means to the destination.

The asset tracking device 122 includes one or more types of sensors for sensing physical properties that the asset and the asset tracking device 122 are exposed to. In one embodiment, the asset tracking device 122 is intermittently activated to sense the physical properties and/or transmit data related to the physical properties to the monitoring station 140.

The monitoring station 140 may have a computing device for receiving the data from the asset tracking device 122. The computing device processes the received data and presents the processed data to a user. The monitoring station 140 may also send setting commands to the asset tracking device 122 via the network 130 and the communication station 110 to configure the operation of the asset tracking device 122.

Architecture of Asset Tracking Device

Figure 2:
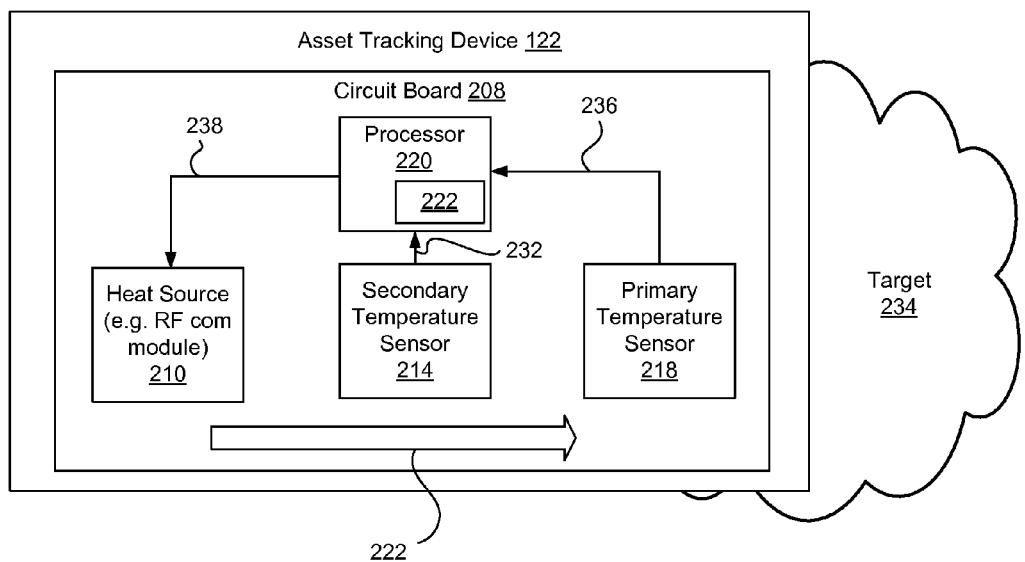
FIG. 2 is a block diagram illustrating a tracking device according to one embodiment of the present invention.

FIG. 2 is a block diagram illustrating an asset tracking device 122 according to one embodiment of the present invention. The tracking device 122 may include one or more circuit boards on which components such as a heat source 210, a primary temperature sensor 218, a secondary temperature sensor 214, and a processor 220 are mounted. The asset tracking device 122 may include other components such as analog-to-digital converters or batteries that are omitted from FIG. 2 for the sake of simplification. In one embodiment, the asset tracking device 122 is a physically integrated unit that contains its components within a sealed housing. The asset tracking device 122 may also include a power source (e.g., battery) to power its electronic components. The asset tracking device 122 may be conveniently placed within or outside the asset of interest.

In one embodiment, the asset tracking device 122 includes components (not shown) for identifying its location. Such components employ, for example, GPS (Global Positioning System) or cell identification technology.

The heat source 210 may be any components of the asset tracking device 122 that generates a sufficient amount of heat to affect the temperature measurement at the primary temperature sensor 218. The heat source 210 is, for example, a radio frequency (RF) communication module for communicating with the monitoring station 140 via wireless communication. The RF communication module may communicate with a long-range communication network such as a cellular network, a 3GPP LTE (long term evolution) network, a WIFI network and a WIMAX network. The RF communication module may also be a short-range communication network such as Bluetooth, Zigbee or WIFI. The heat source 210 may also be a processing unit, GNSS (Global Positioning System) receiver, or large power components that dissipate a significant amount of energy.

In one embodiment, circuit components including a heat source are mounted on the same circuit board 208 as a primary temperature sensor 218. By mounting the RF communication module 210 and the primary temperature sensor 218 on the same circuit board 208, the number of components in the asset tracking device 122 can be reduced while increasing reliability by reducing the number of wires. However, the heat generated by the heat source 210 may increase the amount of heat transferred to the primary temperature sensor 218 through heat conduction (illustrated by arrow 222), resulting in inaccurate temperature measurements at the primary temperature sensor 218. The heat from the heat source 210 may also increase the temperature within the interior of the tracking device 122 through convection and radiation. Even if the heat source 210 and the primary source 218 are mounted on different circuit boards, the heat generated by the heat source 210 may cause the primary temperature sensor to generate inaccurate reading due to convection and radiation of the heat generated by the heat source 210. Hence, a secondary temperature sensor 214 is provided to correct the temperature measurements at the primary temperature sensor 218.

The primary temperature sensor 218 generates a sensor signal 236 which is an analog or digital representation of the temperature of the target 234. The primary temperature sensor 218 may be embodied, for example, as thermocouples, thermistors, bimetallic devices, thermometers or silicon diodes. In one embodiment, the primary temperature sensor 218 is located close to the outer housing or outside the housing of the asset tracking device 122 to generate a more accurate reading of the temperature of the target 234.

The secondary temperature sensor 214 may be placed at various locations in the circuit board 208. Preferably, the secondary temperature sensor 214 is placed at a location closer to the heat source 210 than the primary temperature sensor 218 so that the heating and cooling of the heat source 210 results in a larger temperature change in the temperature measured at the secondary temperature sensor 214. In one embodiment, the secondary temperature sensor 214 is placed at a location between the heat source 210 and the primary temperature sensor 218. The secondary temperature sensor 214 generates a sensor signal 232 which is an analog or digital representation of the temperature at the location where the secondary temperature sensor 214 is placed.

The target 234 may include, for example, an asset (e.g., cargo) or ambient medium (e.g., air) surrounding the asset tracking device 122. The primary temperature sensor 218 may come in direct contact with the target 234 to measure the temperature of the target 234. Alternatively, the primary temperature sensor 218 may measure the temperature of the asset indirectly by measuring the ambient medium between the asset tracking device 122 and the target 234.

The processor 220 controls the operation of the asset tracking device 122. The processor 220 receives the sensor signals 232, 234 from the primary temperature sensor 218 and the secondary temperature sensor 214. If the sensor signals 232, 234 are analog signals, these signals may be processed into digital data at an analog-to-digital converter that is part of the processor 220 or a component (not shown) separate from the processor 220. The processor 220 executes a correction algorithm to temperature values as represented by the sensor signals to obtain a corrected temperature value. The instructions for performing the correction algorithm are stored in a computer-readable storage medium 222 such as RAM (Random Access Memory) or FLASH memory. The processor 220 also sends the corrected temperature value 238 to an RF communication module (incidentally also the heat source 210) for transmission to the monitoring station 140.

Although the asset tracking device 122 is described above with reference to FIG. 1 as including a single heat source 210, two or more heat sources may be included in the asset tracking device 122. Moreover, two or more secondary temperature sensors may be included in the asset tracking device 122 to measure two-dimensional or three-dimensional temperature gradients for more accurate correction of the temperature measurements.

Establishing Relationships Between Measured Temperatures and Actual Temperature

The asset tracking device 122 may adopt complicated schemes to minimize consumption of energy. The asset tracking device 122 may be turned on intermittently to start sensing and sending data to the monitoring station 140 only at certain times and then turned off to preserve energy. The heat source 210 may be turned on intermittently to perform a function (e.g., transmitting data). Due to such intermittent operation of the heat source 210, it is difficult to estimate the amount of heat generated by the heat source 210 and then correct the measured temperature on this basis. Hence, embodiments employ one or more secondary temperature sensor to measure changes in temperature at locations in the asset tracking device 122 due to the heat source 210, and compensate the measured temperature of the target 234 using the temperature measured at the one or more secondary temperature sensors.

The algorithm executed by the processor 220 estimates the accurate temperature of the target 234 based on the sensor signals 232, 236. The algorithm may be developed and then deployed on the asset tracking device 122. The algorithm may include at least one parameter to account for the relationships between the temperature measured at the primary temperature sensor 218, the temperature measured at the secondary sensor 214 and the actual temperature of the target 234. The parameter may be established by experiments or modeling of the heat transfer characteristics of the asset tracking device 122.

In one embodiment, the following equation is used for computing the corrected temperature where a single secondary sensor 214 and a single heat source 210 are present in the asset tracking device 122:

$$T_{corr} = T_{218} + f_1(T_{218}, T_{214}) + K \qquad \text{Equation (1)}$$

where $T_{corr}$ refers to the corrected temperature of the target 234, $T_{218}$ refers to the temperature measured at the primary temperature sensor 218, $T_{214}$ refers to the temperature measured at the secondary temperature sensor 214, $f_1$ refers to scale compensation function, and K refers to a bias adjustment parameter. The scale compensation function $f_1$ is selected and defined to reflect the thermodynamic properties of the device such as heat conductivity of the circuit board 208, the distance between the heat source 210 and the temperature sensors 214, 218. The following is an example of scale compensation function $f_1$:

$$f_1 = -\alpha * SQRT(|T_{218} - T_{214}|) \qquad \text{Equation (2)}$$

where α is a scaling factor (e.g., α=0.5) and SQRT represent a square root function.

In order to determine the scale compensation function $f_1$ and the bias adjustment parameter K, the asset tracking device 122 may be placed in a calibrated temperature chamber, and then subject to various conditions where the actual temperature of a target, the temperatures at the at the first temperature sensor 218 and the secondary temperature sensor 214 are varied within predetermined temperature ranges. The measured data are then fitted to the scale compensation function $f_1$ and the bias adjustment parameter K. Alternatively, the scale compensation function $f_1$ and the bias adjustment parameter K may be obtained by using a computer model representing the thermodynamic properties of the asset tracking device 122.

Equation (1) obtained by fitting the temperature values obtained from the temperature chamber or computer modeling enables corrected temperature $T_{corr}$ to be computed within a predetermined temperature range. After function $f_1$ and bias adjustment parameter K are determined for the asset tracking device 122, the computer readable storage medium 222 is stored with a corresponding instructions that allows the processor 220 to compute the corrected temperature $T_{corr}$.

When multiple secondary temperature sensors or multiple heat sources are included in the asset tracking device 122, equation (1) can be generalized as follows:

$$T_{corr\_2} = f_2(\{T_1(t_i \ldots t_j), T_2(t_k \ldots t_l) \ldots T_n(t_m \ldots t_o)\}) + K_2 \qquad \text{Equation (3)}$$

where $T_{corr\_2}$ refers to corrected temperature, $f_2$ refers to a temperature compensation function, $T_1$ refers to the set of temperatures measured at a primary temperature sensor, $T_2$ through $T_n$ refer to temperatures measured at secondary temperature sensors, $t_i \ldots t_j$ refers to samples taken during time interval I through j, $t_k \ldots t_l$ refer to samples k through l, and $t_m \ldots t_o$ refer to samples m through o, and $K_2$ refers to a bias adjustment parameter. Equation (3) can accommodate multiple heat sources or sinks as well as time compensation. The time compensation allows modeling of the time it takes for the heat to propagate across the device, and therefore, increase the accuracy of the compensation.

Note that function $f_2$ of equation (3) is more general than function $f_1$ of equation (2), and can also compensate for effects dependent upon time and material. Materials can have varying conductivity depending on the temperature of the material. Hence, function $f_2$ may vary the amount of compensation depending on the sampled temperatures even when the absolute differences between the sampled temperatures are the same. For example, the compensation may be different for a measured difference of 5° C. between 20° C. and 25° C. compared to the compensation for the same 5° C. difference between −10° C. and −5° C. Function $f_2$ may also take depend on the rate of temperature change to take into account the time taken for thermal transfer to occur. The temperature compensation in a case where the rate of temperature change is 1° C./minute change and the temperature compensation in another case where the rate of temperature change is 5° C./minute are different. Function $f_2$ may also differ the temperature compensation based on the gradient direction of the temperature change. Since heating and cooling of a thermal mass takes time, the temperature curve of the asset tracking device 122 will show a hysteresis. Hence, the temperature compensation may differ depending upon whether the asset tracking device 122 is being heated up or cooled down. Such hysteresis effects are commonly observed in complex assortment of device or component mechanical packages and structures (e.g. LGA (Land Grid Array), SoC (System-on-a-Chip), and multi-chip packages).

Process of Computing Corrected Temperature

Figure 3:
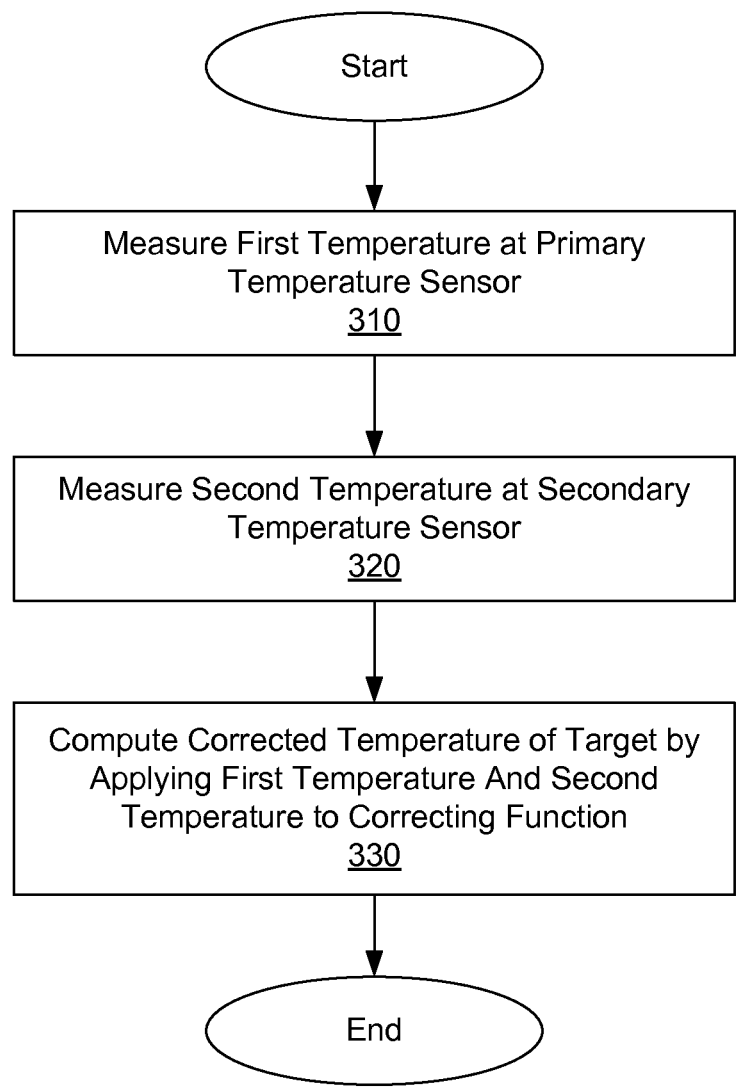
FIG. 3 is a flowchart of a method for obtaining a corrected temperature, according to one embodiment of the present invention.

FIG. 3 is a flowchart of a method for obtaining corrected temperature $T_{corr}$ or $T_{corr\_2}$, according to one embodiment of the present invention. The primary temperature sensor 218 measures 310 a first temperature representing an uncorrected temperature of the target 234 and sends the sensor signal 236 indicating the first temperature to the processor 220.

The secondary temperature sensor 214 also measures 320 a second temperature representing a temperature at the location of the circuit board 208 where the secondary temperature sensor 214 is placed, and sends the sensor signal 232 indicating the second temperature to the processor 220.

The processor 220 then computes 330 the corrected temperature by applying the first temperature and the second temperature to the correction algorithm. The algorithm correction algorithm may compute corrected temperature $T_{corr}$ or $T_{corr\_2}$ based on equation (1) or equation (3). In case equation (3) is used, the history of temperature changes stored in a memory of the processor 220 may be taken into account to compute the compensation. The corrected temperature is a compensated version of uncorrected temperature measured at the primary temperature sensor 218.

The method described above with reference to FIG. 3 is merely illustrative. The steps need not be in the order of sequence illustrated in FIG. 3. For example, measuring 310 of the first temperature may follow measuring 320 of the second temperature or these two steps may be performed in parallel. Moreover, various other steps may be added to compensate for other factors such as drift of the measurements due to other physical characteristics affecting the operation of the temperature sensors 214, 218 such as humidity or pressure.

Result of Temperature Correction

Figure 4:
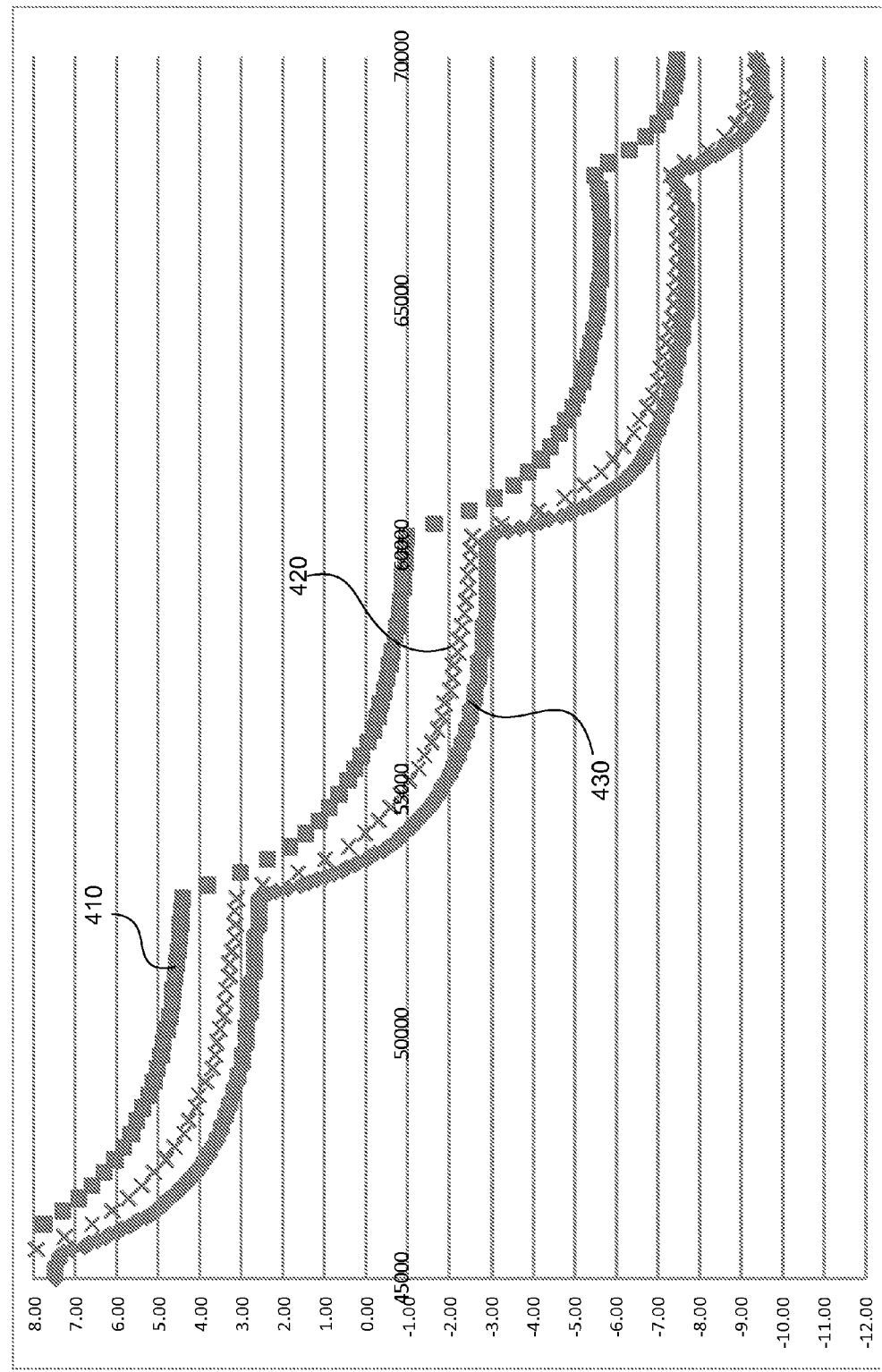
FIG. 4 is a chart illustrating examples of corrected temperatures, actual temperatures and uncorrected temperatures.

FIG. 4 is a chart illustrating examples of corrected temperatures 420, actual temperatures 430 and uncorrected temperatures 410. The corrected temperature 420 was obtained using equation (1). The vertical axis represents the temperature in Celsius and the horizontal axis represents time of the measurements in seconds. As illustrated in FIG. 4, the corrected temperature 420 more closely matches the actual temperature 430 than the uncorrected temperature 410. Therefore, the corrected temperature 430 more accurately reflects the actual temperature of the target 238.

In one embodiment, the asset tracking device 122 collects the sensor signals 232, 236 and sends the information included in the sensor signals 232, 236 to the monitoring station 140 without computing the corrected temperature at the asset tracking device 122. Instead, the monitoring station 140 computes the corrected temperature based on the temperatures measured at the two temperature sensors 214, 218.

In one embodiment, a mixture of heat sources and heat sinks (e.g., cooling elements) may be provided within the asset tracking device 122. The heat sources or heat sinks may be controlled by the processor 220 to maintain the temperature of the assent tracking device 122 at a certain range.

Embodiments herein provide accurate temperature measurements of a target despite presence of one or more heat sources within an asset tracking device without isolating the heat source from the temperature sensor. Hence, the structure of the asset tracking device can be simplified without compromising the reliability or accuracy of temperature measurements.

Although embodiments are described above with reference to asset tracking devices, other types of devices may also be also configured by using the principles described herein. For example, computing devices, network equipments, process plants, automobiles and other industrial equipments may be configured using the configuration scheme described herein.

What is claimed is:

1. A portable asset tracking device for measuring temperature and tracking a location of an asset, comprising:
    a heat source generating heat;
    a primary temperature sensor configured to measure a first temperature of a target, the first temperature sensor receiving at least part of the heat generated at the heat source;
    at least one secondary temperature sensor between the heat source and the primary temperature sensor and configured to measure a second temperature at one or more locations in the portable asset tracking device; and
    a processor configured to compute a corrected temperature of the target using a function representing thermodynamic properties of the portable asset tracking device based on a square root of an absolute difference between the first temperature and the second temperature.

2. The portable asset tracking device of claim 1, wherein parameters for the function is determined by measuring the first and second temperatures in a controlled environment.

3. The portable asset tracking device of claim 1, wherein a history of previously measured temperatures to compute the corrected temperatures is taken into account to compute the corrected temperature of the target.

4. The portable asset tracking device of claim 1, wherein the heat source comprises a communication module for transmitting the corrected temperature to a remote location via long-range wireless communication.

5. The portable asset tracking device of claim 1, wherein the heat source is operated intermittently by the processor.

6. The portable asset tracking device of claim 1, wherein the portable asset tracking device encloses components in a unitary housing.

7. The portable asset tracking device of claim 1, wherein the heat source, the primary temperature sensor and the at least one secondary temperature sensor are mounted on a same circuit board.

8. The portable asset tracking device of claim 1, wherein the function is based on a rate of change in the first temperature or the second temperature.

9. The portable asset tracking device of claim 1, wherein the corrected temperature is computed by adding the first temperature, a value of the function using the first and second temperatures as input values, and a bias adjustment parameter.

10. A method of measuring temperature at a portable asset tracking device, comprising:
    measuring a first temperature of a target by a primary temperature sensor in the portable asset tracking device, the first temperature sensor receiving at least part of heat generated by a heat source in the portable asset tracking device;
    measuring a second temperature of one or more locations in the portable asset tracking device by at least one secondary temperature sensor between the heat source and the primary temperature sensor; and
    at a processor, computing a corrected temperature of the target using a function representing thermodynamic properties of the portable asset tracking device based on a square root of an absolute difference between the first temperature and the second temperature.

11. The method of claim 10, wherein parameters for the function is determined by measuring temperatures in a controlled environment.

12. The method of claim 11, wherein a history of previously measured temperatures is taken into account to compute the corrected temperatures.

13. The method of claim 10, wherein the heat source comprises a communication module for transmitting the corrected temperature to a remote location via long-range wireless communication.

14. The method of claim 10, further comprising intermittently operating the heat source by the processor.

15. The method of claim 10, further comprising tracking a location of the asset and monitoring physical properties of the asset.

16. The method of claim 10, wherein the portable asset tracking device encloses components in a unitary housing.

17. The method of claim 10, wherein the heat source, the primary temperature sensor and the at least one secondary temperature sensor are mounted on a same circuit board in the portable asset tracking device.

18. A non-transitory computer-readable storage medium storing instructions thereon, the instructions when executed by a processor in a portable asset tracking device, cause the processor to:
- receive measurement of a first temperature of a target from a primary temperature sensor in the portable asset tracking device, the first temperature sensor receiving at least part of heat generated by a heat source in the portable asset tracking device;
- receive measurement of a second temperature of one or more locations in the portable asset tracking device from at least one secondary temperature sensor between the heat source and the primary temperature sensor; and
- compute a corrected temperature of the target using a function representing thermodynamic properties of the portable asset tracking device based on a square root of an absolute difference between the first temperature and the second temperature.

* * * * *